United States Patent
Nassif

(10) Patent No.: US 7,347,117 B2
(45) Date of Patent: Mar. 25, 2008

(54) HYDRAULIC LINEAR DRIVE OF A TRANSMISSION ACTUATOR

(75) Inventor: Serge Nassif, Mundolsheim (FR)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 122 days.

(21) Appl. No.: 11/191,920

(22) Filed: Jul. 29, 2005

(65) Prior Publication Data
US 2006/0025269 A1  Feb. 2, 2006

(30) Foreign Application Priority Data
Jul. 30, 2004  (DE)  ............ 10 2004 037 104

(51) Int. Cl.
*F15B 15/14* (2006.01)
*F16D 25/10* (2006.01)

(52) U.S. Cl. ............ 74/335; 475/116; 475/128; 192/86; 192/87.19; 91/437

(58) Field of Classification Search ........... 475/116, 475/128, 143; 192/87.18
See application file for complete search history.

(56) References Cited

U.S. PATENT DOCUMENTS

| | | | | |
|---|---|---|---|---|
| 3,713,291 A | * | 1/1973 | Kubik | 60/444 |
| 5,249,476 A | * | 10/1993 | Zaiser et al. | 74/335 |
| 5,893,292 A | * | 4/1999 | Lanting | 74/335 |
| 6,003,427 A | * | 12/1999 | Asbrand et al. | 91/447 |
| 6,102,829 A | * | 8/2000 | Muddell et al. | 477/77 |
| 6,301,984 B1 | * | 10/2001 | Petzold | 74/335 |
| 6,723,021 B2 | * | 4/2004 | Claus et al. | 477/68 |
| 6,941,912 B2 | * | 9/2005 | Palesch et al. | 123/90.17 |
| 2002/0014130 A1 | * | 2/2002 | Ogami et al. | 74/335 |
| 2002/0148310 A1 | * | 10/2002 | Uchino | 74/335 |

OTHER PUBLICATIONS

Translation of German Publication mentioned in Specification entitled: "Toothed Gearing", Second Edition vol. 26, Springer Verlag, 5 pages.
Looman, Johannes, Zahnradgetriebe [Gear Wheels], 2nd Edition, pp. 158-160, vol. 26, with 5 pages (English translation).

* cited by examiner

Primary Examiner—Richard M. Lorence
Assistant Examiner—Edwin A Young
(74) Attorney, Agent, or Firm—Crowell & Moring LLP

(57) ABSTRACT

A hydraulic linear drive for a hydraulic vehicle transmission actuator has a piston/cylinder unit in which an adjusting piston is arranged so it is longitudinally displaceable in a cylinder housing and subdivides the cylinder space into at least two pressure spaces which can receive hydraulic oil through control lines. The optional pressure action on the two pressure spaces is controllable by a shift valve. A connecting line is provided between the two control lines leading to the pressure spaces and a control valve is provided for optionally releasing or blocking the connecting line to further control the pressure force acting on the piston.

6 Claims, 1 Drawing Sheet

HYDRAULIC LINEAR DRIVE OF A TRANSMISSION ACTUATOR

BACKGROUND AND SUMMARY OF THE INVENTION

This application claims the priority of German Application No. 10 2004 037 104.0 filed Jul. 30, 2004, the disclosure of which is expressly incorporated by reference herein.

This invention relates to a hydraulic linear drive. Preferred embodiments of the invention relate to a hydraulic linear drive for a transmission actuator comprising a piston/cylinder unit in which an adjusting piston is arranged to be longitudinally displaceable in a cylinder housing and to subdivide the cylinder housing space into at least two pressure spaces which can receive hydraulic oil through control lines, and a shift valve operable to control optional pressure action on the two pressure spaces.

Hydraulic linear drives are used in automatic transmissions, for example, for synchronizing the gears (see, for example, Johannes Loomann, Zahnradgetriebe [Gear Wheels], $2^{nd}$ edition, pages 156 ff.).

With the generic hydraulic linear drives, the double piston bordered by two pressure spaces is displaced accordingly to the left or right by a pressure action, as described and explained in DE 198 34 955 A1 corresponding to U.S. Pat. No. 6,295,810, for example, the rate of adjustment of the hydraulic piston is adjustable through additional control valves integrated into the two control lines.

An object of this invention is to provide a circuit arrangement with which the adjusting force and/or adjusting speed of the double-acting hydraulic cylinder can be varied easily with only a few hydraulic components. This object is achieved according to certain preferred embodiments of the invention by providing a hydraulic linear drive for a transmission actuator comprising a piston/cylinder unit in which an adjusting piston is arranged to be longitudinally displaceable in a cylinder housing and to subdivide the cylinder housing space into at least two pressure spaces which can receive hydraulic oil through control lines, and a shift valve operable to control optional pressure action on the two pressure spaces, wherein a connecting line is provided between two control lines leading to the pressure spaces with a control valve for optionally releasing or blocking the connecting line.

Due to the fact that a connecting line in which a control valve optionally either releases or blocks the connecting line is provided between the two control lines leading to the pressure spaces, the volume flow to the pressure space acted upon by the pressure is controllable so that the adjusting rate and/or adjusting force of the hydraulic piston can be influenced in this way. For example, when using the linear drive as a hydraulic transmission actuator, a reduction in the synchronous force is possible. If comfortable shifting is desired, then the gear may be engaged with a low adjusting force whereas if a sporty shifting style is desired, the transmission actuator can be operated with a high synchronous force.

Other advantageous embodiments and refinements of the hydraulic linear drive are achieved through the features described herein and in the claims.

The control valve which is integrated into the connecting line has three shift positions in a first advantageous embodiment; in a first shift position, the connecting line is closed; in a second shift position, the connecting line is opened with a small opening cross section and in a third shift position it is opened with a larger opening cross section. In addition to the three discrete shift positions described above, it is also contemplated for the control valve to have an adjustable valve element which is continuously adjustable between a completely open shift position and a completely closed shift position.

In a further advantageous embodiment, the control valve has a first closed shift position and a second open shift position, whereby the control valve can be operated in cycles between these two shift positions. In this way it is also possible to vary the volume flow to the pressure chamber which is acted upon by hydraulic oil and thus to vary the adjusting force acting on the hydraulic piston.

Two exemplary embodiments of this invention are depicted in the drawing and described in greater detail below.

Other objects, advantages and novel features of the present invention will become apparent from the following detailed description of the invention when considered in conjunction with the accompanying drawings.

DETAILED DESCRIPTION OF THE DRAWINGS

Figure 1:
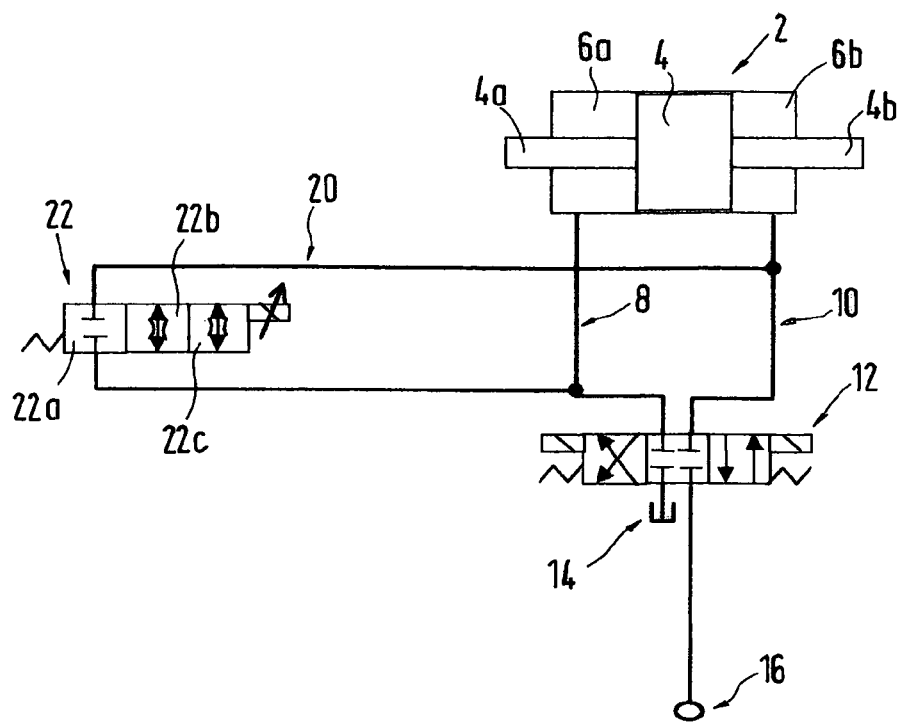
FIG. 1 shows a shifting diagram for a hydraulic linear drive according to a first embodiment of the invention.

The hydraulic linear drive depicted in FIG. 1 can be used, for example as a hydraulic transmission actuator for an automatic transmission, and includes a cylinder housing 2 in which a double acting adjusting piston 4 is accommodated so that it is longitudinally displaceable, and having two piston rods 4a and 4b leading out of the cylinder housing 2 to the right and left. The adjusting piston 4 subdivides the cylinder space into two pressure spaces 6a and 6b, each being connected to a hydraulic control line 8 and 10. The two control lines 8 and 10 are connected to two outputs of a 4/3 shifting valve 12 having two other connections at the input end connected to an oil tank 14 and a pressure source 16, e.g., in the form of an oil pump.

Between the two control lines 8 and 10 leading to the pressure spaces 6a and 6b there is a connecting line 20 in which a control valve 22 optionally releases or blocks the connecting line 20. The control valve 22 has three shift positions, with the connecting line 20 being closed in a first shift position 22a, while in a second shift position 22b the connecting line 20 to the pressure space 6a and/or 6b is throttled with a small opening cross section and in a third shift position 22c it is throttled with a larger opening cross section. In addition to the three discrete shift positions shown, it is also contemplated for the control valve 22 to have a valve element that continuously monitors an opening between "completely open" and "completely closed" according to the other preferred embodiments of the invention.

The adjustment of the adjusting piston 4 and/or the choice of the adjusting force for the adjusting piston 4 is accomplished in the following manner. For example, if the pressure space 6a receives hydraulic oil through the control line 8 via the 4/3 shifting valve 12 in its left shift position, then the pressure in the pressure space 6a can be varied accordingly via the control valve 22 by supplying some of the oil volume flow back to the oil tank 14 through the connecting line 20 and through the control line 10. The quantity of oil flowing back through the connecting line 10 is optionally adjustable via the control valve 22.

Figure 2:
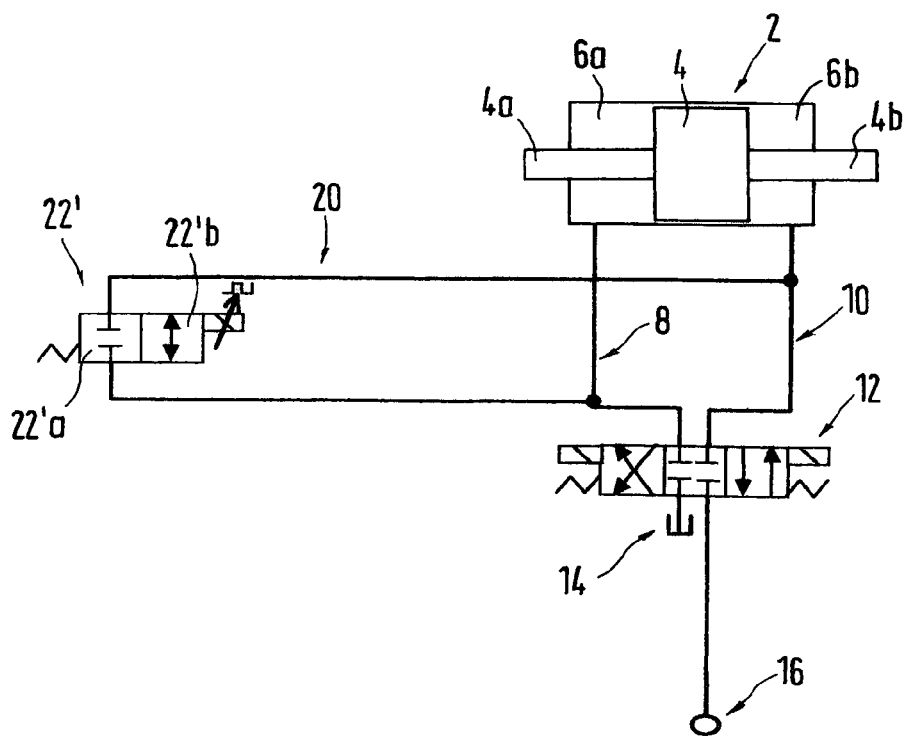
FIG. 2 shows a shifting diagram for a hydraulic linear drive according to a second embodiment of the invention.

The exemplary embodiment depicted in FIG. 2 differs only in the design of the control valve 22', which has only two shift positions—a first closed shift position 22'a and a second opened shift position 22'b. Through cycled operation of this control valve 22' the function described previously for controlling the adjusting rate and/or adjusting force of the adjusting piston 4 can also be implemented.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Hydraulic linear drive for a transmission actuator comprising:
    a piston/cylinder unit in which an adjusting piston is arranged to be longitudinally displaceable in a cylinder housing and to subdivide the cylinder housing space into pressure spaces,
    control lines for supplying hydraulic oil to the pressure spaces,
    a shift valve operatively connected with the control lines to control optional pressure action on the pressure spaces, and
    a connecting line is connected directly to the control lines associated with the pressure spaces, and a control valve associated with the connecting line for selectively releasing or blocking the connecting line.

2. Hydraulic linear drive as claimed in claim 1, wherein the control valve has three shift positions, a first shift position being a position in which the connecting line is closed, a second shift position having an opening cross section and a third shift position having a opening cross section larger than that in the second shift position and in which flow through the connecting line is substantially throttled.

3. Hydraulic linear drive as claimed in claim 1, wherein the control valve has two shift positions, a first closed shift position and a second open shift position, and
    wherein the control valve can be operated in cycles.

4. A linear drive assembly for a vehicle transmission actuator comprising:
    a cylinder housing,
    a longitudinally displaceable adjusting piston disposed in the cylinder housing and dividing the cylinder housing into pressure spaces at opposite sides of the adjusting piston,
    at least one piston rod extending from a respective side of the adjusting piston to outside the cylinder housing for acting on a transmission element to be adjustably moved in response to movement of the piston,
    hydraulic control lines communicating hydraulic fluid to the pressure spaces to thereby adjustably move the piston,
    a connecting line between the hydraulic control lines, and
    a control valve operatively connected to the connecting line to control flow of hydraulic fluid through the connecting line to thereby control the adjusting rate and/or adjusting force acting on the piston.

5. A linear drive assembly according to claim 4, wherein the control valve has three shift positions, a first shift position being a position in which the connecting line is closed, a second shift position having an opening cross section and a third shift position having a opening cross section larger than that in the second shift position and in which flow through the connecting line is substantially throttled.

6. A linear drive assembly according to claim 4, wherein the control valve has two shift positions, a first closed shift position and a second open shift position, and
    wherein the control valve can be operated in cycles.

* * * * *